(12) United States Patent
Vantalon et al.

(10) Patent No.: US 7,802,279 B1
(45) Date of Patent: Sep. 21, 2010

(54) METHODS AND APPARATUSES FOR PROCESSING BROADCAST FLAGGED MEDIA CONTENT

(75) Inventors: Luc Vantalon, Sunnyvale, CA (US); Paolo Siccardo, Los Altos, CA (US)

(73) Assignee: Digital Keystone, Inc., Los Altos, CA (US)

( * ) Notice: Subject to any disclaimer, the term of this patent is extended or adjusted under 35 U.S.C. 154(b) by 1663 days.

(21) Appl. No.: 11/027,638

(22) Filed: Dec. 29, 2004

(51) Int. Cl.
H04N 7/167 (2006.01)

(52) U.S. Cl. .......................... 725/31; 725/68; 725/100; 725/131; 725/139; 725/151

(58) Field of Classification Search ............. 725/27–31, 725/68, 100, 131, 139, 151, 25; 380/200–212, 380/227, 231, 239; 726/26–30; 705/50–51; 713/100, 163

See application file for complete search history.

(56) References Cited

U.S. PATENT DOCUMENTS

| 6,021,197 | A  | * | 2/2000 | von Willich et al. | 380/212 |
| 6,925,180 | B2 | * | 8/2005 | Iwamura | 380/37 |
| 7,269,836 | B2 | * | 9/2007 | Nogima et al. | 725/32 |
| 7,292,692 | B2 | * | 11/2007 | Bonan et al. | 380/212 |
| 2003/0226020 | A1 | * | 12/2003 | Ripley et al. | 713/176 |

OTHER PUBLICATIONS

FCC Report and Order and Further Notice of Proposed Rulemaking, In the Matter of Digital Broadcast Content Protection, released Nov. 4, 2003.*
"The DVB Transport Stream". Digital Television, Lecture 4. Apr. 2003. www.abo.fi/~jbjorkqv/digitv. pp. 1-35.
Digital Broadcast Content Protection, Federal Communication Commission FCC 03-273, Washington D.C., Jan. 2004. pp. 1-72.
"Implications of the Broadcast Flag: A Public Interest Primer", (version 2.0). A Report of the Center for Democracy and Technology, Dec. 2003. pp. 1-39.
Paul Boutin. "Will the Broadcast Flag Break Your TiVO?" The FCC ruling explained. Nov. 2003.

* cited by examiner

*Primary Examiner*—Andrew Y Koenig
*Assistant Examiner*—Aklil Tesfaye
(74) *Attorney, Agent, or Firm*—Blakely, Sokoloff, Taylor & Zafman LLP (57) ABSTRACT

Methods and Apparatuses for content protection of broadcast flagged programs for digital television devices that use CableCARDs. In one embodiment, a filter is used to prevent program content in a clear format from being exposed on the CableCARD connector. In one embodiment, broadcast flagged programs in a clear format are filtered for a CableCARD so that no high definition version of the broadcast flagged programs can be easily recorded via the circuitry of the CableCARD. The filter may degrade the broadcast flagged programs, or zero the broadcast flagged programs, or delete the broadcast flagged programs from the transport stream.

31 Claims, 5 Drawing Sheets

METHODS AND APPARATUSES FOR PROCESSING BROADCAST FLAGGED MEDIA CONTENT

TECHNOLOGY FIELD

At least some embodiments of the invention relate to media content protection, more particularly to protection of media content marked by a broadcast flag.

BACKGROUND

Conditional access (CA) is a technique for limiting the access of content (e.g., audiovisual works such as movies) to authorized users. For example, CA systems have been developed for cable TV and non-cable TV including digital television (DTV). In a CA system for digital television, the media content is scrambled (encrypted) using a standard algorithm before broadcasting. The key used for scrambling/descrambling the media content in a CA system is called a control word (CW). The control word is securely provided to the subscribers through entitlement control messages and entitlement management messages. A security device uses the control word to descramble (decrypt) the received media content.

A CableCARD is a removable security device for conditional access and service signal demodulation in a cable television system. A CableCARD is typically in a PCMCIA or PC card form factor. When inserted in a set top box, television or other device, a CableCARD enables delivery of digital video pay programming and other services, such as in a cable television system in accordance with an OpenCable specification. CableCARDs are typically provided by the cable operator or cable provider to subscribers.

One technique for limiting the diffusion of media content in digital television signals that are broadcast over the air in-the-clear involves the use of a broadcast flag. A data tag, called broadcast flag, can be used to mark a program. If a program is marked with the broadcast flag, any Federal Communications Commission (FCC) rule compliant device must refuse to allow the broadcast flagged program to be exposed in-the-clear on any of the device digital output. See, for example, FCC Report and Order and Further Notice of Proposed Rulemaking, MB Docket No. 02-230, In The Matter of Digital Broadcast Content Protection, released Nov. 4, 2003.

SUMMARY OF THE DESCRIPTION

Methods and apparatuses for content protection of broadcast flagged programs for digital television devices that use CableCARDs are described here. At least some embodiments are summarized in this section.

In one aspect of an embodiment of the present invention, a media presentation device, includes: a port for receiving a CableCARD; a switch coupled to the port which has an input port for a program to be inputted into the CableCARD and an output port for content to be outputted from the CableCARD; and a detector of a broadcast flag coupled to the switch. If the broadcast flat is set the switch prevents a program associated with the broadcast flag which is set from being exposed on a connector for the CableCARD or from being inputted into at least some of the circuitry in the CableCARD.

In one example, the device further includes: a display screen coupled to the switch; and a tuner coupled to the switch, where the tuner is to provide a transport stream containing a digital representation of the content for the input port through the switch.

In one example, the switch disconnects the transport stream from the input port to prevent a program associated with the broadcast flag which is set from being exposed on the CableCARD connector.

In one example, the switch includes a logic block which removes a program associated with the broadcast flag which is set from the transport stream. In another example, the switch includes a logic block, which zeroes a program associated with the broadcast flag which is set in the transport stream.

In one example, the switch is on to bypass from the input port to the output port when a program associated with the broadcast flag which is set is selected. The switch is off when a program tuned to for viewing is not in a clear format.

In one example, the detector detects the broadcast flag using data from the output port. In another example, the detector detects the broadcast flag using data entering the input port.

In one aspect of an embodiment of the present invention, a method for controlling a media presentation device, includes: detecting whether a broadcast flag is set for an associated representation of content; bypassing circuitry within a CableCARD in the media presentation device such that the associated representation of the content is not available in the circuitry within the CableCARD in response to detecting that the broadcast flag is set when the associated representation of the content is selected.

In one example, bypassing the circuitry prevents a transport stream from being exposed on the CableCARD connector.

In one example, the method further includes: modifying a transport stream for the circuitry to block an associated program for which the broadcast flag is set from being exposed on the CableCARD connector. In one example, modifying the transport stream includes deleting an associated program for which the broadcast flag is set from the transport stream. In another example, modifying the transport stream includes zeroing an associated program for which the broadcast flag is set in the transport stream.

In one example, any associated program for which the broadcast flag is set and which is in a clear format is blocked from being exposed on the CableCARD connector.

In one example, the circuitry within a CableCARD is not bypassed when the broadcast flag is not set for the associated representation of the content and the associated representation of the content is selected.

In one aspect of an embodiment of the present invention, a circuit for a media presentation device includes: a detector of a program in a clear format; and a filter coupled to the detector, the filter to prevent the program in the clear format from being exposed on the CableCARD connector.

In one example, the detector is to further detect a broadcast flag; and the filter is to prevent the program that is in the clear format and that has the broadcast flag from being exposed on the CableCARD connector. The filter is to allow a program that is in the clear format and that has no broadcast flag to be delivered to the CableCARD.

In one example, the filter is to allow the program in the clear format to bypass the CableCARD when the program in the clear format is selected for consumption.

In one aspect of an embodiment of the present invention, a method for controlling a media presentation device includes: detecting whether a program is in a clear format; and bypassing circuitry within a CableCARD in the media presentation device such that the program is not available in the circuitry within the CableCARD in response to detecting that the program is in the clear format when the program is selected. In one example, bypassing the circuitry prevents a transport stream from being exposed on a connector for the Cable-CARD. In another example, a transport stream is modified for the circuitry within the CableCARD to block an associated program for which the broadcast flag is set from being exposed on a connector for the CableCARD.

In one aspect of an embodiment of the present invention, a media presentation device includes: a port for receiving a CableCARD; a bypass switch coupled to the port, the bypass switch having an input port for a program to be inputted in to the CableCARD and an output port for content to be outputted from the CableCARD; and a detector coupled to the bypass switch, the detector to detect if a program is in a clear format when selected for consumption and to cause the bypass switch to prevent the program from being exposed to a connector on the port. In one example, the media presentation device further includes: a display screen coupled to the bypass switch; and a tuner coupled to the bypass switch.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

In one embodiment of the present invention, the broadcast flag protected in-the-clear digital television signals are broadcast through a cable television system, together with CA protected programs. CableCARD support requires the host device to send received digital programming to the Cable-CARD for conditional access processing. Thus, at least the CA protected programs need to be routed through the Cable-CARD for conditional access authorization. A least one embodiment of the present invention protects the connector between the host device and the CableCARD while receiving Broadcast Flag protected programming.

In one embodiment of the present invention, a broadcast flag based filter is used to prevent the broadcast flagged programs from being exposed in-the-clear on the CableCARD connector.

Figure 1:
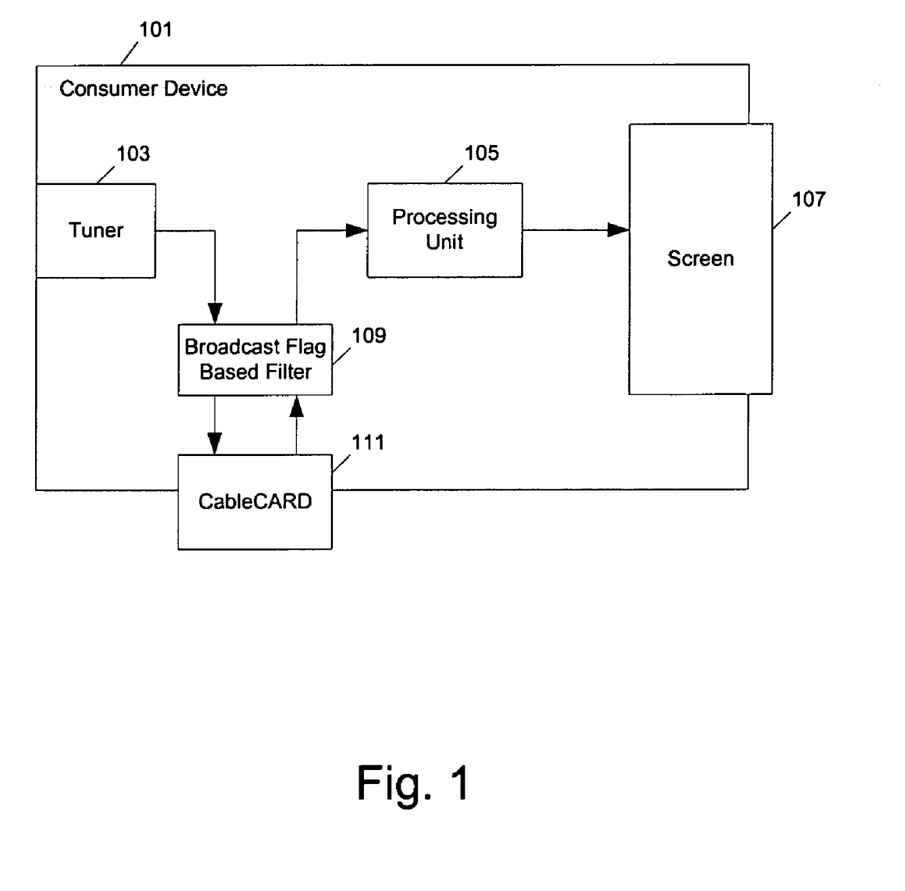
FIG. 1 shows a device with an output management mechanism media content protection for media content marked with a broadcast flag according to one embodiment of the present invention.

FIG. 1 shows a device with an output management mechanism for protection of media content marked with a broadcast flag according to one embodiment of the present invention. In FIG. 1, the tuner (103) generates a transport stream according to the signals received from a cable television cable. The CableCARD (111) receives the transport stream and performs conditional access descrambling. The broadcast flag based filter (109) is used to bypass the CableCARD (111) for the broadcast flagged programs that are selected for consumption (e.g., for watching on a television set or for recording in a digital video recorder) and to block unused broadcast flagged programs from being exposed in-the-clear on the CableCARD (111) connector when the selected program is conditional access protected. The processing unit (105) drives the screen (107) according to the output of the Cable-CARD, or the transport stream that bypass the CableCARD via the broadcast flag based filter (109), to show the program that is selected to for watching.

In one embodiment, the broadcast flag based filter (109) is built into the consumer device (101). The broadcast flag based filter (109) is connected to the port for the CableCARD (111) so that the broadcast flagged programs are not exported to any CableCARD.

In one embodiment, the broadcast flag based filter (109) prevents the entire transport stream from entering the Cable-CARD (111) when the broadcast flagged program is selected for consumption. When the broadcast flagged program is selected for consumption, the broadcast flag based filter (109) provides a path for the transport stream to bypass the Cable-CARD (111). When a conditional access program is selected for consumption, the broadcast flag based filter (109) blacks out any adjacent broadcast flagged programs in the transport stream before allowing the transport stream to enter the CableCARD.

In one embodiment, the CableCARD receives a version of the transport stream regardless which program is selected. The broadcast flag based filter (109) blacks out any broadcast flagged program in the transport stream before the transport stream enters the CableCARD. The broadcast flag based filter (109) offers a bypass path for the transport stream that contains the broadcast flagged programs. The broadcast flag based filter (109) selects from the bypass path or from the output of the CableCARD (111) based on whether a broadcast flagged program is selected. For example, when a broadcast flagged program is tuned to for watching, the input from the bypass path is selected; when no broadcast flagged program is selected (or when a CA protected program is tuned to for watching), the output of the CableCARD (111) is selected.

In one embodiment of the present invention, a broadcast flagged program may or may not be CA protected. When the content of the broadcast flagged programs are not in a clear format, the broadcast flagged programs can be allowed to enter the CableCARD (111). The broadcast flagged programs that are in a clear format are filtered from the transport stream that enters the CableCARD.

FIG. 1 illustrates a consumer device (101) with a screen (107), such as a television set. Other devices without a screen, such as a set top box (STB), a digital video recorder (DVR), can also use the broadcast flag based filter to protect media content marked with a broadcast flag against in-the-clear exposure on the connector for the CableCARD or within at least some of the circuitry in the CableCARD.

Figure 2:
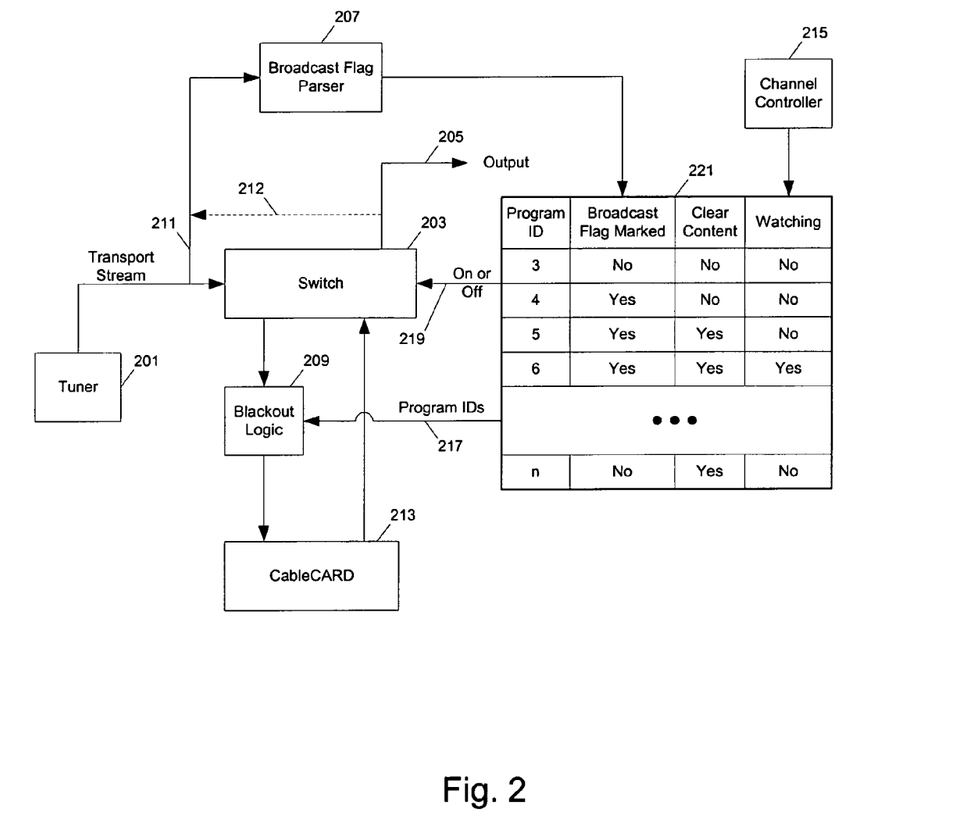
FIG. 2 illustrates a circuit to prevent media content for which a broadcast flag is set from being exposed in-the-clear on the CableCARD connector according to one embodiment of the present invention.

FIG. 2 illustrates a circuit to prevent media content for which a broadcast flag is set from entering a CableCARD according to one embodiment of the present invention. In FIG. 2, a tuner (201) generates a transport stream from the signals received from a cable television cable. The transport stream includes a mixture of data from different programs.

Figure 5:
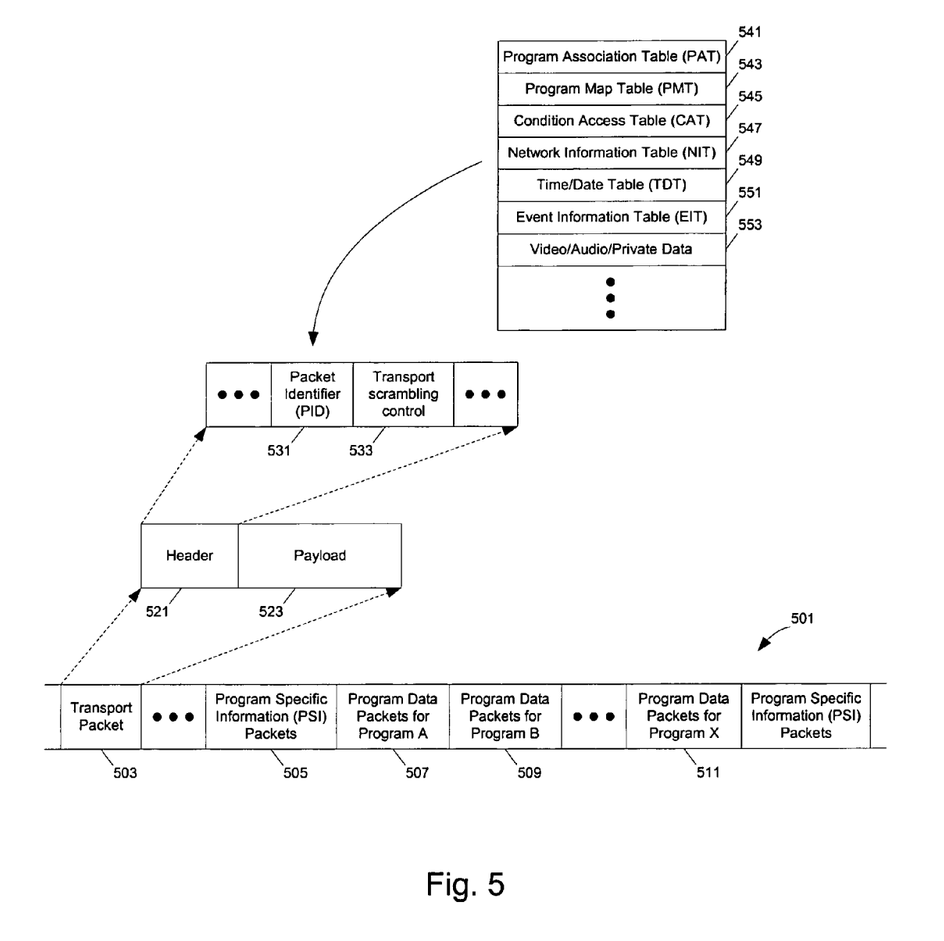
FIG. 5 shows the structure of a transport stream which can be used with embodiments of the present invention.

FIG. 5 shows the structure of a transport stream which can be used with embodiments of the present invention. In FIG. 5, the transport stream (501) contains a stream of packets to provide multiple programs in a time multiplexed way. A typically transport packet (503) of the transport stream (501) includes header (521) and payload (523). The header (521) includes a field for packet identifier (PID) (531). The header (521) may further include a field for transport scrambling control (533). The packet identifier (531) indicates the type of the transport package. Different types of transport packages include packages for Program Association Table (PAT) (541), Program Map Table (PMT) (543), Condition Access Table (CAT) (545), Network Information Table (NIT) (547), Time/Date Table (TDT) (549), Event Information Table (EIT) (551), Video/Audio/Private Data (553), etc.

The Program Association Table (PAT) contains the list of programs in the transport stream and PID for the Program Map Table (PMT) for each program. The Program Map Table (PMT) contains the PIDs for the data channels associated with a particular program. The Network Information Table (NIT) can be used to provide information such as channel frequencies, service originator, service name, etc. The Condition Access Table (CAT) provides details of the scrambling system in use and provides PIDs of the packets that contain the CA information. The Event Information Table (EIT) provides information on events, start times, etc. The Time/Date Table (TDT) provides information about present time and data.

In FIG. 5, the transport stream (501) includes Program Specific Information (PSI) Packets (505) which provides information for a decoder to determine the structure of the transport stream. For example, the Program Specific Information (PSI) Packets (505) typically include packets for the Program Association Table (PAT), Program Map Table (PMT), Condition Access Table (CAT), Network Information Table (NIT), Time/Date Table (TDT), Event Information Table (EIT), Video/Audio/Private Data, etc. Program data packets for different programs, such as 507-511, provides the media content data for different programs that are time multiplexed in the transport stream (501).

In FIG. 2, a switch (203) is capable of providing a path for the transport stream to bypass the CableCARD (213). A broadcast flag parser (207) checks the transport stream before the switch (203) on the line (211), or alternatively after the switch (203) using the line (212), to detect the programs that are in a clear format and that have the broadcast flag. Program information (221) is generated from the broadcast flag parser (207) and the channel controller (215). For a given program ID that is detected in the transport stream, the program information (221) shows whether or not the program is broadcast flag marked, whether or not the program has clear content, and whether or not the program is selected for consumption (e.g., for watching on a television set or for recording on a digital video recorder).

In one embodiment, only a portion of the program information (221) is generated, since only the programs of a clear format and broadcast flag marked need filtering. In an alternative embodiment, the programs of a clear format are filtered, regardless whether the programs are broadcast flag marked.

According to the program information (221), a control signal for the switch (203) is generated. The switch (203) is either on or off to allow the transport stream to bypass the CableCARD (213). In one embodiment, if the program selected is in a clear format and is broadcast flag marked, the switch (203) is on to bypass the CableCARD (213); otherwise, the output from the CableCARD (213) is sent to the output line (205).

Alternatively, the switch (203) is on whenever the program selected is in a clear format; the output from the CableCARD (213) is used for the output line (205) when the program selected is a CA protected program.

The switch (203) may be used to switch from sending the transport stream either directly to the output line 205 or to the blackout logic (209). Alternatively, the switch (203) may be used to switch from receiving the transport stream for the output line (205) either directly from the transport stream from the tuner (201) or from the output of the CableCARD (213).

According to the program information (221), the blackout logic (209) blacks out the content of the broadcast flagged programs that are in a clear format. For example, the blackout logic (209) may zero the data for the broadcast flagged clear programs (e.g., set the data bits for the programs to all zero or all ones), or scramble the data for the broadcast flagged clear programs (e.g., set a portion or all of the data bits of the programs to random bits, or zeros, or ones), or delete the data for the broadcast flagged clear programs from the transport stream. Further, the blackout logic (209) may partially zero or scramble the data for the broadcast flagged clear programs so that the broadcast flagged clear programs don't enter the CableCARD (213).

Alternatively, the blackout logic (209) blacks out the content of all programs in clear format, regardless whether the programs are broadcast flag marked. In such an embodiment, the broadcast flag parser (207) only needs to determine the program IDs for the programs that are in a clear format; and the switch (203) lets the transport stream to bypass the CableCARD when a program in a clear format is selected (e.g., for viewing or recording).

Figure 3:
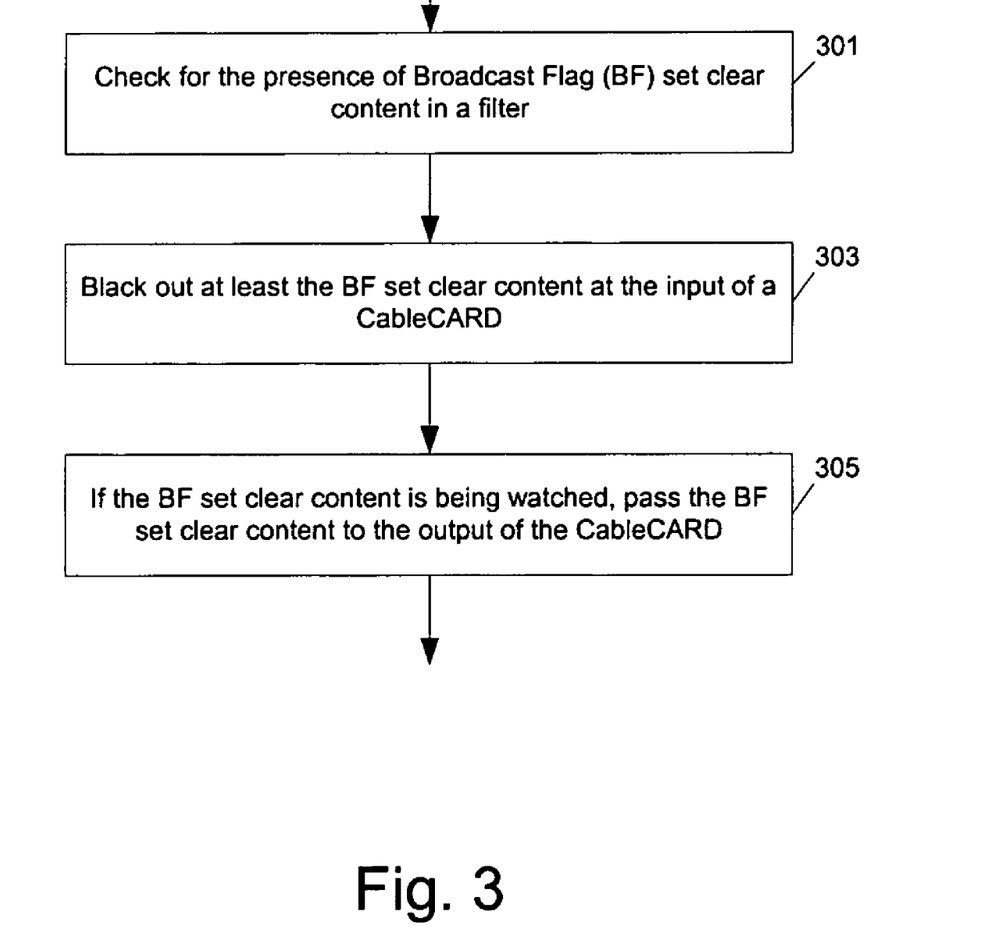
FIG. 3 shows a flow chart of a method to prevent media content for which a broadcast flag is set from being exposed in-the-clear on the CableCARD connector according to one embodiment of the present invention.

FIG. 3 shows a flow chart of a method to prevent media content for which a broadcast flag is set from entering a CableCARD according to one embodiment of the present invention.

Operation 301 checks for the presence of Broadcast Flag (BF) set clear content in a filter. Operation 303 blacks out at least the BF set clear content at the input of a CableCARD. If the BF set clear content is being watched, operation 305 passes the BF set clear content to the output of the CableCARD. Alternatively, all clear content may be blacked out (e.g., blacked out completely or partially so that no high definition content is available in the CableCARD); and the transport stream bypasses the CableCARD when a clear content program is selected for consumption.

Figure 4:
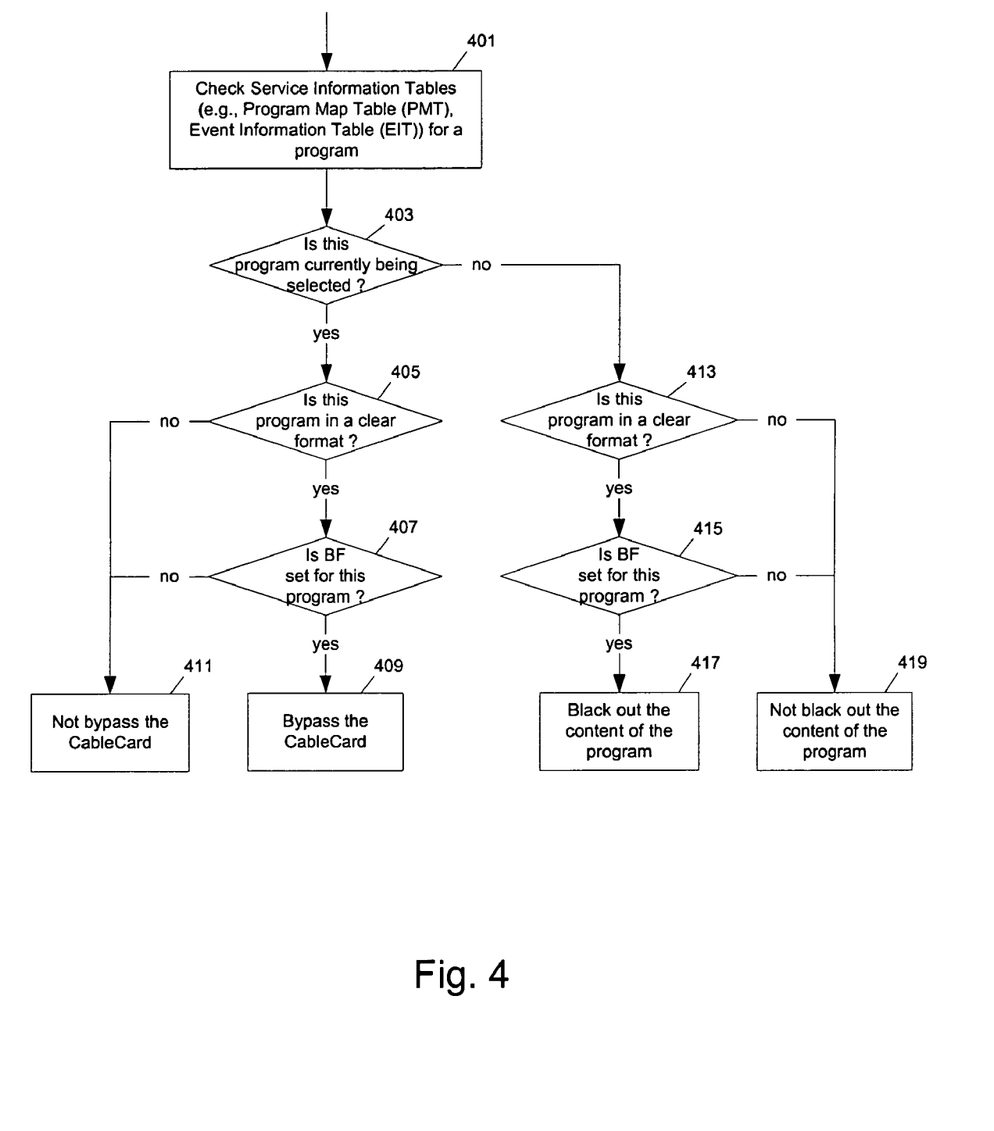
FIG. 4 shows a method to prevent media content for which a broadcast flag is set from being exposed in-the-clear on the CableCARD connector according to one embodiment of the present invention.

FIG. 4 shows a method to prevent media content for which a broadcast flag is set from entering a CableCARD according to one embodiment of the present invention. Operation 401 checks service information tables that carry the broadcast flag: Program Map Table (PMT) and Event Information Table (EIT).

If operation 403 determines that this program is currently being selected (e.g., for viewing or recording), operations 405 is performed. If operation 405 determines that this program is in a clear format and operation 407 determines that BF is set for this program, the transport stream bypasses the Cable-CARD in operation 409; otherwise, the transport stream does not bypass the CableCARD in operation 411.

In one embodiment, when the transport stream bypasses the CableCARD, the transport stream does not enter the CableCARD. Alternatively, the transport stream is still being inputted into the CableCARD; however, the transport stream is modified to black out the content for the BF set program that is in a clear format.

If operation 403 determines that this program is not currently selected, operations 413 is performed. If operation 413 determines that this program is in a clear format and operation 415 determines that BF is set for this program, operation 417 blacks out the content of the program; otherwise, operation 419 does not black out the content of the program.

In an alternative embodiment, operations 407 and 415 are not performed. If operation 405 determines that this program is in a clear format, the transport steam bypasses the CableCARD. If operation 413 determines that this program is in a clear format, operation 417 blacks out the content of the program.

In one embodiment, a black out operation blacks out the content of the corresponding program.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A media presentation device, comprising:
a port for receiving a CableCARD;
a switch coupled to the port which has an input port for a program to be inputted into the CableCARD and an output port for content to be outputted from the CableCARD; and
a detector of a broadcast flag coupled to the switch;
wherein if the broadcast flag is set the switch prevents a program associated with the broadcast flag which is set from being exposed on a connector for the CableCARD;
wherein the switch comprises a logic block which removes a program associated with the broadcast flag which is set from the transport stream.

2. The device of claim 1, further comprising:
a display screen coupled to the switch; and
a tuner coupled to the switch, the tuner providing a transport stream containing a digital representation of the content for the input port through the switch.

3. The device of claim 2, wherein the switch disconnects the transport stream from the input port to prevent a program associated with the broadcast flag which is set from being exposed in-the-clear on the connector for the CableCARD.

4. A media presentation device, comprising:
a port for receiving a CableCARD;
a switch coupled to the port which has an input port for a program to be inputted into the CableCARD and an output port for content to be outputted from the CableCARD; and
a detector of a broadcast flag coupled to the switch;
wherein if the broadcast flag is set the switch prevents a program associated with the broadcast flag which is set from being exposed on a connector for the CableCARD, wherein the switch comprises a logic block which zeros a program associated with the broadcast flag which is set in the transport stream.

5. The device of claim 1, wherein the switch is on to bypass from the input port to the output port when a program associated with the broadcast flag which is set is selected.

6. The device of claim 5, wherein the switch is off when a program tuned to for viewing is not in a clear format.

7. A media presentation device, comprising:
a port for receiving a CableCARD;
a switch coupled to the port which has an input port for a program to be inputted into the CableCARD and an output port for content to be outputted from the CableCARD; and
a detector of a broadcast flag coupled to the switch;
wherein if the broadcast flag is set the switch prevents a program associated with the broadcast flag which is set from being exposed on a connector for the CableCARD, wherein the detector detects the broadcast flag using data from the output port.

8. A media presentation device, comprising:
a port for receiving a CableCARD;
a switch coupled to the port which has an input port for a program to be inputted into the CableCARD and an output port for content to be outputted from the CableCARD; and
a detector of a broadcast flag coupled to the switch;
wherein if the broadcast flag is set the switch prevents a program associated with the broadcast flag which is set from being exposed on a connector for the CableCARD, wherein the detector detects the broadcast flag using data entering the input port.

9. A method for controlling a media presentation device, the method comprising:
detecting whether a broadcast flag is set for an associated representation of content; and
bypassing circuitry within a CableCARD in the media presentation device such that the associated representation of the content is not available in the circuitry within the CableCARD in response to detecting that the broadcast flag is set when the associated representation of the content is selected;
wherein said bypassing the circuitry prevents a transport stream from being exposed on a CableCARD connector.

10. A method for controlling a media presentation device, the method comprising:
detecting whether a broadcast flag is set for an associated representation of content; and
bypassing circuitry within a CableCARD in the media presentation device such that the associated representation of the content is not available in the circuitry within the CableCARD in response to detecting that the broadcast flag is set when the associated representation of the content is selected; and
modifying a transport stream for the circuitry within the CableCARD to block an associated program for which the broadcast flag is set from being exposed on a CableCARD connector.

11. The method of claim 10, wherein said modifying comprises:
deleting an associated program for which the broadcast flag is set from the transport stream.

12. The method of claim 10, wherein said modifying comprises:
zeroing an associated program for which the broadcast flag is set in the transport stream.

13. The method of claim 10, wherein any associated program for which the broadcast flag is set and which is in a clear format is blocked from being exposed on the CableCARD connector.

14. A method for controlling a media presentation device, the method comprising:
   detecting whether a broadcast flag is set for an associated representation of content; and
   bypassing circuitry within a CableCARD in the media presentation device such that the associated representation of the content is not available in the circuitry within the CableCARD in response to detecting that the broadcast flag is set when the associated representation of the content is selected, wherein the broadcast flag is detected using an input data stream to the CableCARD.

15. A method for controlling a media presentation device, the method comprising:
   detecting whether a broadcast flag is set for an associated representation of content; and
   bypassing circuitry within a CableCARD in the media presentation device such that the associated representation of the content is not available in the circuitry within the CableCARD in response to detecting that the broadcast flag is set when the associated representation of the content is selected, wherein the broadcast flag is detected using an output data stream from the CableCARD.

16. A method for controlling a media presentation device, the method comprising:
   detecting whether a broadcast flag is set for an associated representation of content; and
   bypassing circuitry within a CableCARD in the media presentation device such that the associated representation of the content is not available in the circuitry within the CableCARD in response to detecting that the broadcast flag is set when the associated representation of the content is selected, wherein the circuitry within a CableCARD is not bypassed when the broadcast flag is not set for the associated representation of the content and the associated representation of the content is selected.

17. A circuit for a media presentation device, the circuit comprising:
   a detector of a program in a clear format; and
   a filter coupled to the detector, the filter to prevent the program in the clear format from being exposed on a connector for the CableCARD;
   wherein the detector is to further detect a broadcast flag; and the filter is to prevent the program that is in the clear format and that has the broadcast flag from being exposed on the connector for the CableCARD.

18. The circuit of claim 17, wherein the filter is to allow a program that is in the clear format and that has no broadcast flag to be exposed on the connector for the CableCARD.

19. A circuit for a media presentation device, the circuit comprising:
   a detector of a program in a clear format; and
   a filter coupled to the detector, the filter to prevent the program in the clear format from being exposed on a connector for the CableCARD, wherein the filter is to allow the program in the clear format to bypass the at least some of the circuitry of the CableCARD in a high definition form when the program in the clear format is selected.

20. A circuit for a media presentation device, the circuit comprising:
   means for detecting a program in a clear format; and
   means for preventing the program in the clear format from being exposed on a connector for the CableCARD; and
   means for detecting a broadcast flag, wherein a program that is in the clear format and that has the broadcast flag is prevented from being exposed on the connector for the CableCARD.

21. The circuit of claim 20, wherein a program that is in the clear format and that has no broadcast flag is allowed to be exposed on the connector for the CableCARD.

22. A method for controlling a media presentation device, the method comprising:
   detecting whether a program is in a clear format; and
   bypassing circuitry within a CableCARD in the media presentation device such that the program is not available in the circuitry within the CableCARD in response to detecting that the program is in the clear format when the program is selected;
   wherein said bypassing the circuitry prevents a transport stream from being exposed on a connector for the CableCARD.

23. A method for controlling a media presentation device, the method comprising:
   detecting whether a program is in a clear format; and
   bypassing circuitry within a CableCARD in the media presentation device such that the program is not available in the circuitry within the CableCARD in response to detecting that the program is in the clear format when the program is selected and
modifying a transport stream for the circuitry within the CableCARD to block an associated program for which the broadcast flag is set from being exposed on a connector for the CableCARD.

24. A media presentation device, comprising:
   a port for receiving a CableCARD;
   a switch coupled to the port which has an input port for a representation of content to be inputted into the CableCARD and an output port for content to be outputted from the CableCARD; and
   a detector of a broadcast flag coupled to the switch;
   wherein if the broadcast flag is set the switch prevents a representation of content associated with the broadcast flag which is set from being inputted into at least some of circuitry in the CableCARD,
   wherein the switch comprises a logic block which removes a representation of content associated with the broadcast flag which is set from the transport stream.

25. The device of claim 24, further comprising:
   a tuner coupled to the switch, the tuner providing a transport stream containing a digital representation of the content for the input port through the switch.

26. The device of claim 25, wherein the switch disconnects the transport stream from the input port to prevent a representation of content associated with the broadcast flag which is set from being inputted into the at least some of the circuitry in the CableCARD.

27. The device of claim 24, wherein the switch is on to bypass from the input port to the output port when a representation of content associated with the broadcast flag which is set is tuned to for viewing.

28. The device of claim 27, wherein the switch is off when a representation of content tuned to for viewing is not in a clear format.

29. A media presentation device, comprising:
   a port for receiving a CableCARD;
   a switch coupled to the port which has an input port for a representation of content to be inputted into the CableCARD and an output port for content to be outputted from the CableCARD; and
   a detector of a broadcast flag coupled to the switch;

wherein if the broadcast flag is set the switch prevents a representation of content associated with the broadcast flag which is set from being inputted into at least some of circuitry in the CableCARD, wherein the switch comprises a logic block which zeros a representation of content associated with the broadcast flag which is set in the transport stream.

30. A media presentation device, comprising:

a port for receiving a CableCARD;

a switch coupled to the port which has an input port for a representation of content to be inputted into the Cable-CARD and an output port for content to be outputted from the CableCARD; and a detector of a broadcast flag coupled to the switch;

wherein if the broadcast flag is set the switch prevents a representation of content associated with the broadcast flag which is set from being, inputted into at least some of circuitry in the CableCARD, wherein the detector detects the broadcast flag using data from the output port.

31. A media presentation device, comprising:

a port for receiving a CableCARD;

a switch coupled to the port which has an input port for a representation of content to be inputted into the Cable-CARD and an output port for content to be outputted from the CableCARD; and a detector of a broadcast flag coupled to the switch:

wherein if the broadcast flag is set the switch prevents a representation of content associated with the broadcast flag which is set from being inputted into at least some of circuitry in the CableCARD, wherein the detector detects the broadcast flag using data entering the input port.

* * * * *